UNITED STATES PATENT OFFICE.

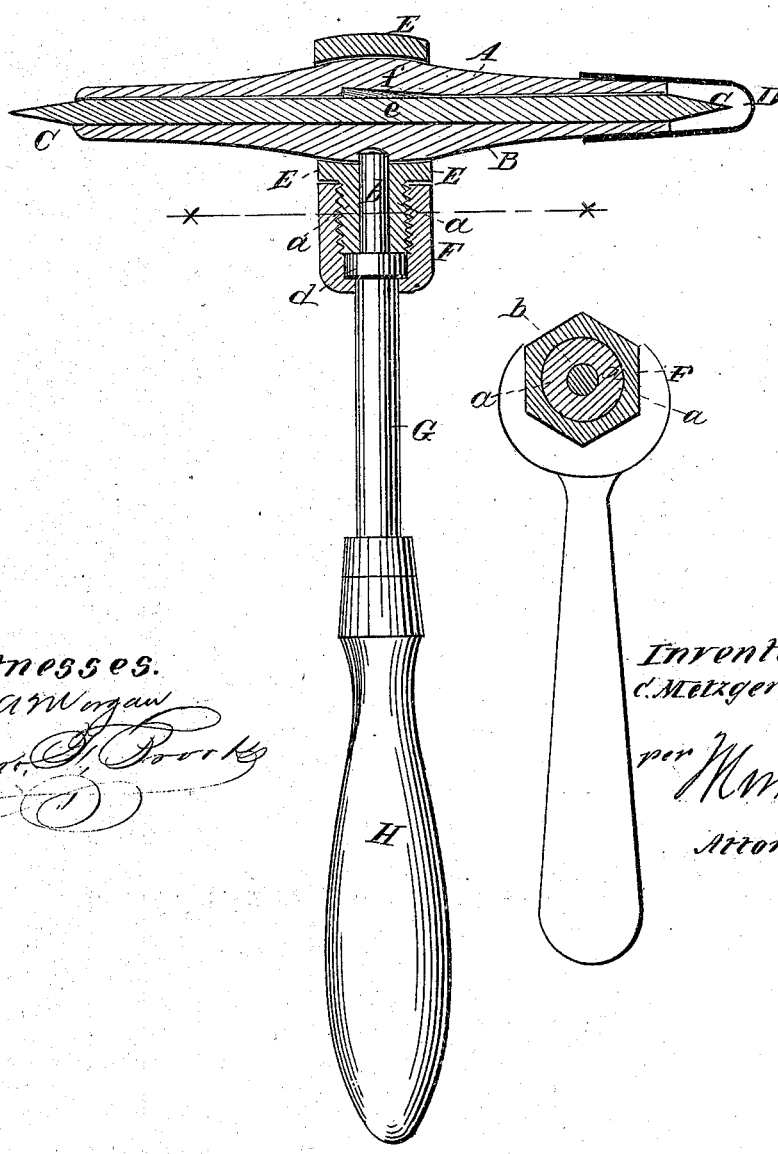

CHARLES METZGER AND G. R. RORABACK, OF DE SOTO, MISSOURI.

IMPROVED MILL-PICK.

Specification forming part of Letters Patent No. 95,252, dated September 28, 1869; antedated September 17, 1869.

*To all whom it may concern:*

Be it known that we, CHARLES METZGER and G. R. RORABACK, of De Soto, in the county of Jefferson and State of Missouri, have invented new and useful Improvements in Mill-Picks; and we do hereby declare that the following is a full, clear, and exact description thereof, which will enable those skilled in the art to make and use the same, reference being had to the accompanying drawings, forming part of this specification, in which—

Figure 1 is a longitudinal section of our invention. Fig. 2 is a section through the coupling-nut and threaded bars at the line $x\,x$, Fig. 1.

Similar letters of reference indicate corresponding parts.

The object of our invention is to provide a millstone-pick combining several advantageous features, as herein set forth.

The holder consists of two plates, A and B, of the same width as the pick plate or bit C, and diminishing in thickness from their middle points toward their ends, as shown. These are connected, for convenience in taking out and setting in the pick-plate, by a U-shaped spring, D, which is affixed to the ends of both holder-plates, as shown. The bit C is held between the plates A B, and the three parts thus arranged are held within a band, E, which encircles them. The inner surface of one part of this band E is slightly concave to fit the convex part $f$ of the plate A, as shown, in order to keep the plates from being slipped in the band by the blow upon the stone.

The band E is formed with a threaded boss, $a$, which has a central hole in it, through which the reduced part $b$ of the shank G passes, to impinge upon the holder-plate B when drawn against it by the coupling-nut F. This nut is formed with a hollow thread and a circular recess, which latter receives the collar $d$ at the junction of the shank G and its reduced part $b$. The nut turns freely on the shank, and its thread, engaging that of the boss $a$, provides the means of drawing the holder-plates firmly toward each other, with the bit C clamped between them, as shown. A wrench is used, as shown in Fig. 2, for turning the nut. The shank G is affixed in any suitable handle, H. The plate B is indented or formed with a shallow circular recess where the reduced part $b$ impinges against it, in which the end of the said part $b$ rests.

This device is to assist in preventing the holder-plates from being moved in the band E by the force of the blows upon the stone, as aforesaid.

To prevent the pick plate or bit C from slipping in the plates from the same cause, a small wedge-shaped block, $e$, fitting loosely in a corresponding recess in the proximate face of one of the holder-plates, as that of A, is employed. The outer surface of this wedge $e$ is flush with the surface of the plate, and is roughened or corrugated, so as to hold by friction against the proximate surface of the pick-bit, and be moved upward with it should the pick-bit begin to slip in the holder-plates. The edge of this wedge is arranged upward, so that it will, in beginning to leave the recess, act to jam or bear against the bit, and thus prevent its slipping upward in the holder-plates.

We claim as new and desire to secure by Letters Patent—

1. The combination, with the holder-plates A B of a millstone-pick, of a band, E, having a threaded boss, $a$, and the coupling-nut F working thereon, to actuate the part $b$ of the shank G against the plate B, substantially as herein shown and described.

2. The spring-connection D, when employed in combination with holder-plates A B of a millstone-pick, substantially as and for the purpose herein shown and described.

3. The employment of a wedge-block, $e$, located within a recess in the inner face of one of the holder-plates of a millstone-pick, to prevent the bit from slipping in the holder-plates, substantially as herein shown and described.

4. The recess in the holder-plate B of a millstone-pick for the reception of the end of the part $b$, in combination with the said part, for the purpose of preventing the said plate from slipping in the band E, substantially as herein shown and described.

CHARLES METZGER.
G. R. RORABACK.

Witnesses:
B. S. REPPY,
M. A. DOUTHETT.